(12) United States Patent
Hioki

(10) Patent No.: US 10,939,020 B2
(45) Date of Patent: Mar. 2, 2021

(54) PRINTING SYSTEM, COLOR MATCHING METHOD, AND PROGRAM

(71) Applicant: MIMAKI ENGINEERING CO., LTD., Nagano (JP)

(72) Inventor: Wataru Hioki, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 0 days.

(21) Appl. No.: 16/784,249

(22) Filed: Feb. 7, 2020

(65) Prior Publication Data

US 2020/0267285 A1 Aug. 20, 2020

(30) Foreign Application Priority Data

Feb. 15, 2019 (JP) ............................. JP2019-025738

(51) Int. Cl.
*G06F 3/12* (2006.01)
*H04N 1/60* (2006.01)
*B41J 2/21* (2006.01)
*H04N 1/23* (2006.01)

(52) U.S. Cl.
CPC .......... *H04N 1/6036* (2013.01); *B41J 2/2103* (2013.01); *H04N 1/2315* (2013.01); *H04N 1/6008* (2013.01); *H04N 1/6044* (2013.01)

(58) Field of Classification Search
None
See application file for complete search history.

(56) References Cited

U.S. PATENT DOCUMENTS

| 2006/0276978 A1 | 12/2006 | Yamamoto et al. |
| 2009/0316234 A1* | 12/2009 | Yamamoto ........... H04N 1/6033 358/505 |
| 2012/0081722 A1* | 4/2012 | Katayama .......... G06K 15/1878 358/1.9 |
| 2015/0242724 A1* | 8/2015 | Nishizaki ............. H04N 1/6008 358/3.21 |
| 2018/0041664 A1* | 2/2018 | Konishi ................. B41J 2/2146 |

FOREIGN PATENT DOCUMENTS

JP 2009124538 6/2009

OTHER PUBLICATIONS

"Search Report of Europe Counterpart Application", dated Jun. 30, 2020, p. 1-p. 14.

* cited by examiner

*Primary Examiner* — Henok Shiferaw
(74) *Attorney, Agent, or Firm* — JCIPRNET

(57) ABSTRACT

The reproduction of a target color is appropriately performed with high accuracy. A printing system 10 includes a printing device 12 and a host PC 14 that is a control device. The printing device 12 includes a plurality of inkjet heads 202y to 202k and a colorimeter 204. The host PC 14 is capable of performing a color matching process for matching a color printed by the inkjet heads 202y to 202k with a target color, and performs, in the color matching process, a target color acquiring process for acquiring the target color using the colorimeter 204, an initial value setting process for setting an initial value of a color setting value, and a target color corresponding value determination process for selecting a patch having a color close to a target color from among a plurality of patches by causing the inkjet heads 202y to 202k to print the patches.

16 Claims, 6 Drawing Sheets

PRINTING SYSTEM, COLOR MATCHING METHOD, AND PROGRAM

CROSS REFERENCE TO RELATED APPLICATIONS

This application claims the priority benefit of Japanese Patent Application No. 2019-025738, filed on Feb. 15, 2019. The entirety of the above-mentioned patent application is hereby incorporated by reference herein and made a part of this specification.

TECHNICAL FIELD

The present invention relates to a printing system, a color matching method, a control device, and a program.

BACKGROUND ART

In recent year, an inkjet printer that is a printing device for printing by an inkjet method has been widely used. In addition, as to a method for printing with high quality in an inkjet printer, a method for performing color matching in order to reproduce colors displayed in a color sample book in a conventional manner or the like has been known (for example, refer to Patent Literature 1).

Patent Literature 1: Japanese Unexamined Patent Publication No. 2009-124538

SUMMARY

In recent year, due to widened applications of an inkjet printer or the like, expressing the desired colors with higher reproducibility may be required. For example, in the case of expressing by printing a specific color (for example, corporate color) or the like associated with a trademark or the like, it is desired to reproduce a target color with higher accuracy. Therefore, the present invention provides a printing system, a color matching method, a control device, and a program that can solve the above problem.

The inventor of this application had made intensive research for a method to reproduce a target color with high accuracy and then considered to carry out color matching by performing colorimetry of a color of an object in which the target color was actually expressed by a colorimeter. As a color matching method performed in this case, it was also considered to repeat an operation for printing a plurality of patches that are made different in color from each other and an operation for selecting a patch having a color closest to a target color from among these patches. As this repetitive operation, it was also considered to perform processes including a first color selection process, a second color selection process, or the like described below. By this configuration, for example, the target color can appropriately be reproduced with high accuracy.

Moreover, the inventor of the present application has found features necessary for obtaining such an effect as a result of further intensive study, and reached the present invention. To solve the problem described above, the present invention provides a printing system for printing by an inkjet method including a printing device for printing by an inkjet method and a control device for controlling an operation of the printing device, in which the printing device includes a plurality of inkjet heads for ejecting inks of colors different form each other by the inkjet method and a colorimeter for performing colorimetry of a color printed by the inkjet heads, the control device is capable of performing a color matching process for matching a color printed by the inkjet heads in the printing device with a target color; in the color matching process, a target color acquiring process for acquiring the target color by causing the colorimeter in the printing device to perform colorimetry of a color of an object in which the target color is expressed, an initial value setting process for setting an initial value of a color setting value that is a value indicating an ejection amount of ejecting an ink of each color by each of the inkjet heads, and a target color corresponding value determination process that is a process for determining a target color corresponding value that is the color setting value corresponding to the target color, through which the inkjet heads are caused to print a plurality of patches that are respectively associated with the color setting values different from each other and a patch having a color close to the target color is selected from among the patches to determine the target color corresponding value are performed; in the target color corresponding value determination process, a first color selection process for selecting a patch having a color close to the target color from among the patches having the color setting values different from each other at a preset first interval and a second color selection process for selecting a patch having a color close to the target color from among the patches having the color setting values different from each other at a second interval that is narrower than the first interval are performed; in the first color selection process, a first reference value setting process for setting an initial value of the color setting value set in the initial value setting process as a first reference value that is a reference color setting value in the first color selection process, a first patch printing process for causing the inkjet heads to print the patches having the color setting values different from each other from the first reference value at the first interval, and a first patch selection process for selecting a patch having a color closest to the target color from among the patches based on the colorimetric measurement result for the patches obtained by causing the colorimeter to perform colorimetry of the colors of the patches printed by the first patch printing process and the target color acquired in the target color acquiring process are performed; and in the second color selection process, a second reference value setting process for setting the color setting value corresponding to the patch selected as the patch having the color closest to the target color in the first color selection process as a second reference value that is the reference color setting value in the second color selection process, a second patch printing process for causing the inkjet heads to print the patches having the color setting values different from each other from the second reference value at the second interval, and a second patch selection process for selecting a patch having a color closest to the target color from among the patches based on the colorimetric measurement result for the patches obtained by causing the colorimeter to perform colorimetry of the colors of the patches printed by the second patch printing process and the target color acquired in the target color acquiring process are performed.

In the case of having such a configuration, for example, it is possible to quickly and appropriately narrow down the color setting value that can reproduce the colors close to the target color by performing the first color selection process in which the interval between the color setting values is widened. In addition, by using the result obtained from the first color selection process and performing the second color selection process in which the interval between the color setting values is narrowed, a range of the color setting value that can reproduce the colors close to the target color can be narrowed down to a smaller range. Therefore, by this configuration, for example, the target color can appropriately be reproduced with high accuracy.

In this configuration, the reference color setting value means, for example, a color setting value used as a center value when printing the patches that are made variously different in color setting value. In the initial value setting process, for example, it is preferable to set the initial value of the color setting value according to the target color acquired in the target color acquiring process. By this configuration, for example, the initial value close to the target color can appropriately be set. It can be considered, in the initial value setting process, for example, to set the initial value of the color setting value by using a profile for setting an initial value setting (for example, an ICC profile) prepared in advance.

In this configuration, each of the inkjet heads ejects an ink of each color of, for example, cyan, magenta, yellow, and black. In this case, as the color setting value, for example, it can be considered to use a value associated with an ejection amount of an ink of each color of cyan, magenta, yellow, and black. By this configuration, for example, various colors can appropriately be expressed by the inkjet heads by variously changing the color setting value. As the patch, for example, it can also be considered to form an area in which a certain range (for example, a predetermined rectangular range) is filled with the color having the corresponding color setting value.

In this configuration, in the target color corresponding value determination process, a third color selection process in which the interval between the color setting values is further narrowed may also be performed. In this case, the third color selection process can be considered, for example, as a process for selecting a patch having a color close to the target color from among the patches having the color setting values different from each other at a third interval that is narrower than the second interval. By this configuration, for example, the target color can appropriately be reproduced with higher accuracy.

More specifically, in the third color selection process, for example, it can be considered that a third reference value setting process, a third patch printing process, a third patch selection process, or the like are performed. The third reference value setting process means, for example, in the second color selection process, a process for setting the color setting value corresponding to a patch selected as a patch having a color closest to the target color as a third reference value that is a reference color setting value in the third color selection process. The third patch printing process means, for example, a process for causing the inkjet heads to print the patches having the color setting values different from each other from the third reference value at the third interval. The third patch selection process means, for example, a process for selecting a patch expressing a color closest to the target color from among the patches based on the colorimetric measurement result for the patches obtained by causing the colorimeter to perform colorimetry of the colors of the patches printed by the third patch printing process and the target color acquired in the target color acquiring process.

In the target color corresponding value determination process, for example, the target color corresponding value that is the color setting value used for expressing the target color based on the colorimetric measurement result for the patches in which the interval between the color setting values is made narrowest is determined. For example, it can be considered that when performing the first color selection process, the second color selection process, and the third color selection process in the target color corresponding value determination process, the target color corresponding value is determined in the third color selection process. It can also be considered that when performing only the first color selection process and the second color selection process in the target color corresponding value determination process without performing the third color selection process, the target color corresponding value is determined in the second color selection process. It can also be considered that when performing the process for printing the patches in which the interval between the color setting values are made narrower than that of the third color selection process in the target color corresponding value determination process, the target color corresponding value is determined in this process.

In this configuration, it can also be considered that, for example, the first patch printing process and the first patch selection process are repeated a plurality of times in the first color selection process as necessary. In this case, for example, it can be considered to repeat the first patch printing process and the first patch selection process until a predetermined condition is satisfied while changing the first reference value.

More specifically, for example, in the first color selection process, if the color setting value corresponding to the first selection patch that is the patch selected as the patch having the color closest to the target color in the first patch selection process and the first reference value used in the first patch printing process are different, the color setting value corresponding to the first selection patch is set to a new first reference value and the first patch printing process and the first patch selection process are performed again. In this case, for example, the first patch printing process and the first patch selection process are repeated until the color setting value corresponding to the first selection patch coincides with the first reference value used in the first patch printing process while changing the first reference value based on the selection result of the first selection patch in the first patch selection process. Then, for example, the first selection patch at a point of time when the color setting value corresponding to the first selection patch coincides with the first reference value used in the first patch printing process is selected as the patch having the color closest to the target color in the first color selection process.

In the case of having such a configuration, for example, in the first color selection process, by repeating the first patch printing process and the first patch selection process while changing the first reference value, the patch having the color close to the target color can be selected without limiting a range of the color setting value. In this case, by repeating the first patch printing process and the first patch selection process until the color setting value corresponding to the first selection patch coincides with the first reference value used in the first patch printing process, the patch having the color close to the target color can appropriately be selected with higher accuracy.

In this case, it can be considered that, in the processes after the second color selection process, the color setting value corresponding to the target color, for example, is within a predetermined range determined corresponding to the patch selected finally in the first color selection process. Therefore, it can be considered that, in the processes after the second color selection process, for example, the processes are performed at a higher speed by limiting the range of the color setting value. More specifically, in this case, it can be considered that, for example, in the second color selection process, the patch having the color closest to the target color in the second color selection process is selected by performing the second patch printing process once and the second patch selection process once. By this configuration, for example, the second color selection process can appropriately be performed at a higher speed. In this case, it can be considered that, also in the third color selection process, for example, the patch having the color closest to the target color in the third color selection process is selected by performing the third patch printing process once and the third patch selection process once. By this configuration, for example, the third color selection process can appropriately be performed at a higher speed.

When considering to select the patch having the color close to the target color with higher accuracy in the second color selection process, it can also be considered that, in the second color selection process, the second patch printing process and the second patch selection process are repeated. More specifically, in this case, it can be considered that, in the second color selection process, if the color setting value corresponding to the second selection patch that is the patch selected as the patch having the color closest to the target color in the second patch selection process and the second reference value used in the second patch printing process are different, for example, the color setting value corresponding to the second selection patch is set to a new second reference value and the second patch printing process and the second patch selection process are performed again. In this case, for example, the second patch printing process and the second patch selection process are repeated until the color setting value corresponding to the second selection patch coincides with the second reference value used in the second patch printing process while changing the second reference value based on the selection result of the second selection patch in the second patch selection process. Then, the second selection patch at a point of time when the color setting value corresponding to the second selection patch coincides with the second reference value used in the second patch printing process is selected as the patch having the color closet to the target color in the second color selection process. By this configuration, for example, the second color selection process can appropriately be performed with higher accuracy.

In addition, as a configuration of the present invention, it can also be considered to use a color matching method, a control device, a program, or the like having similar features as described above. In these cases, for example, the similar effects as described above can be obtained.

According to the present invention, for example, the target color can appropriately be reproduced with high accuracy.

BRIEF DESCRIPTION OF THE DRAWINGS

FIG. 1A illustrates one example of a configuration of a printing system 10. FIG. 1B illustrates one example of a configuration of a printing device 12. FIG. 1C illustrates one example of a configuration of a head portion 102 in a printing device 12.

FIG. 4A is a flowchart illustrating one example of a specific operation in the second color selection process. FIG. 4B is a flowchart illustrating one example of a specific operation in the third color selection process.

DESCRIPTION OF EMBODIMENTS

Figure 1A:
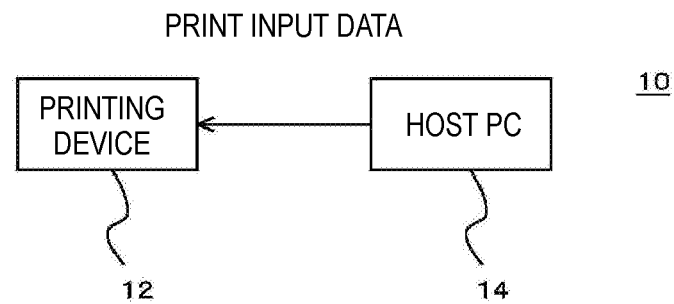
FIGS. 1A to 1C are diagrams illustrating a printing system 10 according to one embodiment of the present invention.
Figure 1B:
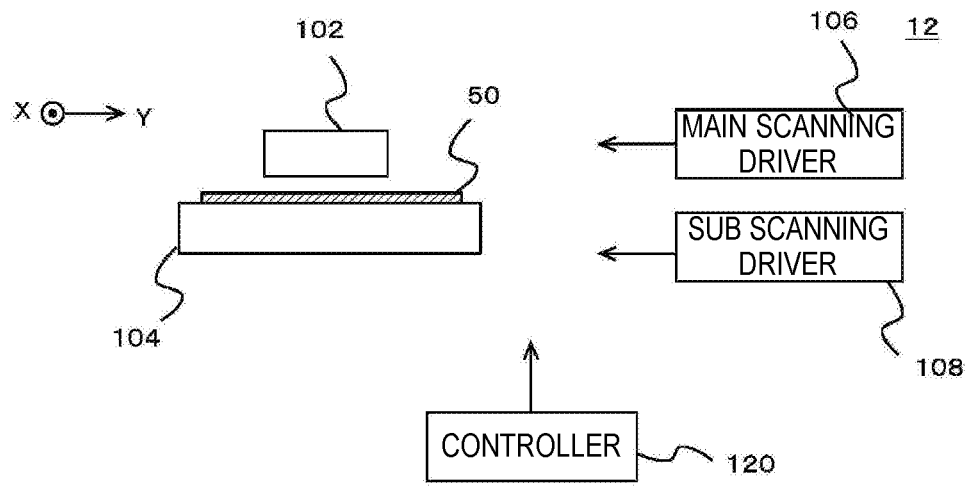
Figure 1C:
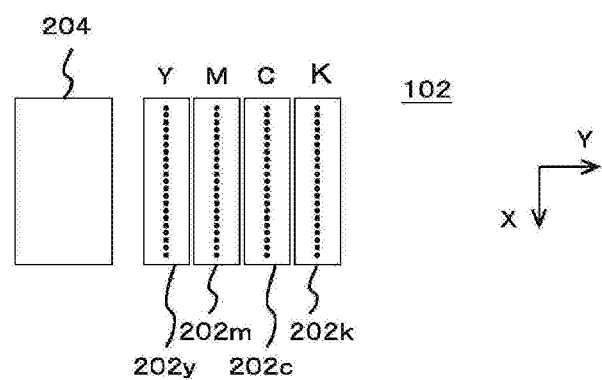

Hereinafter, embodiments according to the present invention will be described with reference to the drawings. FIGS. 1A to 1C are diagrams illustrating a printing system 10 according to one embodiment of the present invention. FIG. 1A illustrates one example of a configuration of the printing system 10. Note that the printing system 10 of this example may have features the same as or similar to those of a well-known printing system except the points described below.

In this example, the printing system 10 is a system for printing on a medium to be printed by an inkjet method and includes a printing device 12 and a host PC. The printing device 12 is an inkjet printer for printing on the medium by the inkjet method and executes a printing operation in accordance with the control of a host PC 14.

The host PC 14 is a computer that functions as a control device for controlling the operation of the printing device 12 and controls the operation of the printing device 12 by providing print input data indicating an image to be printed to the printing device 12. In this example, the host PC 14 further performs a color matching process for adjusting the color expressed (reproduced) by printing in the printing device 12. The color matching process will be described in more detail later.

Next, the printing device 12 in the printing system 10 will be described in more detail. FIG. 1B illustrates one example of a configuration of the printing device 12. FIG. 1C illustrates one example of a configuration of a head portion 102 in the printing device 12. In this example, the printing device 12 includes the head portion 102, a platen 104, a main scanning driver 106, a sub scanning driver 108, and a controller 120.

Note that the printing device 12 may have features the same as or similar to those of a well-known inkjet printer except the points described above and below. The printing device 12 may further include various configurations necessary for the printing operation or the like except configurations illustrated in the drawings. For example, the printing device 12 may further include a fixing device for fixing an ink onto a medium 50 in accordance with the type of ink being used.

The head portion 102 is a part for ejecting an ink on the medium 50. In this example, the head portion 102 includes the inkjet heads and a colorimeter 204. The inkjet heads include an inkjet head 202$y$, an inkjet head 202$m$, an inkjet head 202$c$, and an inkjet head 202$k$ (hereinafter, referred to as inkjet heads 202$y$ to 202$k$) as illustrated in FIG. 1C. In the head portion 102, the inkjet heads 202$y$ to 202$k$ and the colorimeter 204 are, for example, held by a carriage (not shown). Accordingly, when the head portion 102 is moved, the inkjet heads 202$y$ to 202$k$ and the colorimeter 204 are moved together.

Each of the inkjet heads 202y to 202k is an inkjet head for ejecting inks of colors different from each other onto the medium 50 by the inkjet method and includes a plurality of nozzles arranged with the position in a sub scanning direction (X direction in the drawing) set in advance in the printing device 12 shifted, and the inks are ejected from each nozzle toward the medium 50. In this example, the inkjet heads 202y to 202k are arranged side by side in a main scanning direction (Y direction in the drawing) perpendicular to a sub scanning direction with the position in a sub scanning direction aligned.

The ink of each color ejected from the inkjet heads 202y to 202k is an ink of each color that is a basic color (process color) used for color printing (for example, full color printing). More specifically, the inkjet head 202y ejects a yellow color (Y color) ink. The inkjet head 202m ejects a magenta color (M color) ink. The inkjet head 202c ejects a cyan color (C color) ink. The inkjet head 202k ejects a black color (K color) ink.

The colorimeter 204 is a measuring instrument for performing colorimetry of colors printed by the inkjet heads 202y to 202k. As the colorimeter 204, for example, well-known various colorimeters can suitably be used. In this case, as described above, it is preferable to use the colorimeter that can be mounted on the carriage together with the inkjet heads 202y to 202k. More specifically, it can be considered to use a colorimeter incorporating a well-known XYZ sensor, a spectral colorimeter, or the like as the colorimeter 204. In this example, the colorimeter 204, for example, as described in detail below, measures the color of the patch printed on the medium 50 in response to an instruction from the host PC 14 when executing the color matching process or the like.

The platen 104 is a table-like member that holds the medium 50 at a position opposed to the head portion 102. The main scanning driver 106 is a driver causing the inkjet heads 202y to 202k in the head portion 102 to perform a main scanning operation. In this case, the main scanning operation means, for example, an operation for ejecting an ink while relatively moving with respect to the medium 50 in a main scanning direction. In this example, the main scanning driver 106, for example, causes the inkjet heads 202y to 202k to perform the main scanning operation by moving the inkjet heads 202y to 202k side in a main scanning direction with respect to the medium 50 placed on a fixed position in a main scanning direction. In this case, the main scanning driver 106, for example, moves the head portion 102 along a guide rail (not shown). The guide rail means, for example, a rail member that extends in a main scanning direction.

The sub scanning driver 108 is a driver for causing the inkjet heads 202y to 202k to perform a sub scanning operation. In this case, the sub scanning operation means, for example, an operation for relatively moving with respect to the medium 50 in a sub scanning direction. In this example, the sub scanning driver 108, for example, moves the medium 50 side by conveying the medium 50 in a conveying direction parallel to a sub scanning direction using a roller (not shown) or the like and causes the inkjet heads 202y to 202k to perform the sub scanning operation.

The controller 120 has a configuration including, for example, a CPU of the printing device 12 and controls the operation of each portion of the printing device 12. More specifically, the controller 120, for example, causes the inkjet heads 202y to 202k to draw an image to be printed by causing the inkjet heads 202y to 202k to eject inks based on print input data received from the host PC 14.

Next, the color matching process performed in the printing system 10 of this example will be described in more detail. In this example, the host PC 14 in the printing system 10 executes the color matching process according to a predetermined program. In this color matching process, the target color is read by the colorimeter 204 in the printing device 12 and the process for matching the color printed by the inkjet heads 202y to 202k in the printing device 12 with the target color is performed. More specifically, in this case, the host PC 14 performs the color matching to the color to be a target by causing the colorimeter 204 to read the color to be a target of an object in which the target color is expressed and repeating the printing operation and the colorimetric measurement operation of the chart including the patches. In this case, the chart means, for example, an image including a pattern set in order to confirm the characteristics of the printing device 12. The patch is, for example, a portion configuring a part of the chart for confirming the print result. For example, the patch can also be considered as a figure drawn under a certain condition in order to confirm the print result. In this example, the patch is an area for reading one color and is filled with a constant color. In this case, filling with a constant color means, for example, filling at a constant ratio of the ink amount of each color ejected by the inkjet heads 202y to 202k with respect to a unit area.

As described above, in the color matching process performed in this example, the target color is acquired by performing colorimetry of the color to be a target in which the target color is expressed by the colorimeter 204 in the printing device 12. In this case, as to a target, expressing the target color means, for example, that at least a part of a target is colored with the target color. It can be considered that, for example, a specific color (for example, corporate color) or the like associated with a trademark or the like is used as the target color.

Figure 2:
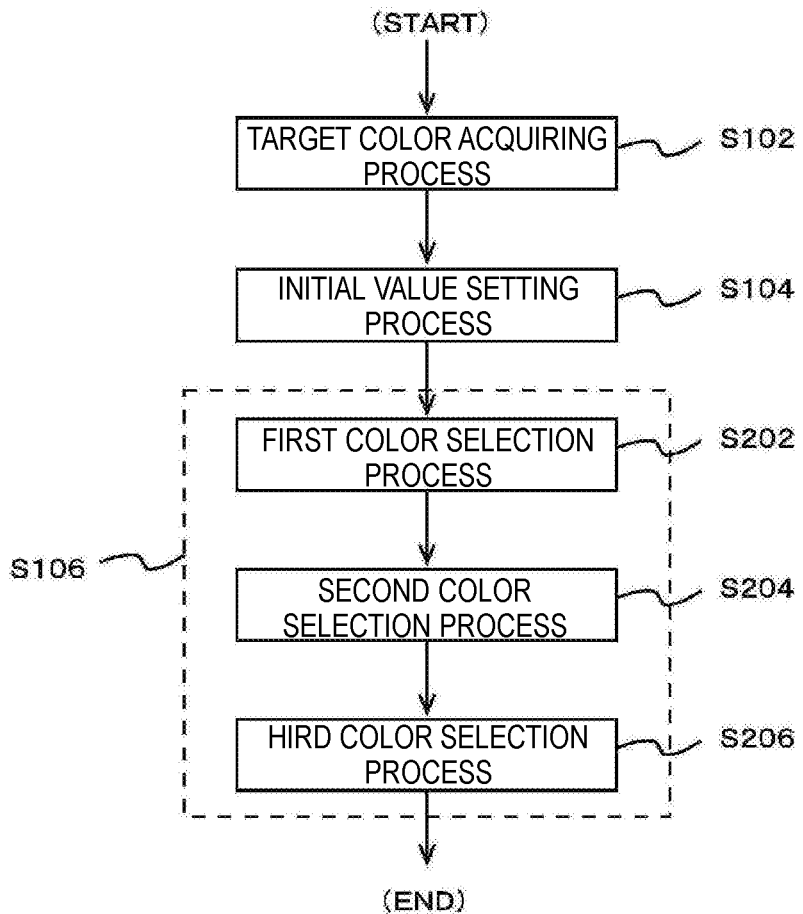
FIG. 2 is a flowchart illustrating one example of an operation for a color matching process performed in this example.

More specifically, in this case, the host PC 14, for example, performs the color matching process by the operation illustrated in FIG. 2. FIG. 2 is a flowchart illustrating one example of the operation of the color matching process performed in this example.

In the color matching process performed in this example, the host PC 14 firstly acquires the target color by causing the colorimeter 204 to perform colorimetry of the color to be a target (S102). In this case, the operation of the step S102 is one example of the operation of a target color acquiring process. In the step S102 of this example, the host PC 14 acquires a Lab value indicating the target color based on the colorimetric measurement result obtained by the colorimeter 204. In this case, the Lab value means a parameter indicating a color in a Lab color system. More specifically, the Lab value can be considered, for example, as a parameter composed of an L value, an a value, and a b value.

In succession to the operation in the step S102, the host PC 14 sets an initial value of a CMYK value corresponding to a color printed by the inkjet heads 202y to 202k (S104). In this case, the operation in the step S104 is one example of the operation of the initial value setting process. The CMYK value is one example of the color setting value. In this case, the color setting value means, for example, a value indicating an ejection amount of each color ink ejected by each of the inkjet heads 202y to 202k. The value indicating the ejection amount, for example, may be a value corresponding to the ejection amount. The value corresponding to the ejection amount means, for example, a value that can set the ejection amount based on the value.

The CMYK value can be considered, for example, as a parameter indicating the color in a CMYK color system. Regarding the CMYK value used as one example of the color setting value, indicating the ejection amount of ejecting an ink of each color by each of the inkjet heads 202y to 202k means, for example, that it is possible to set the ejection amount of ejecting an ink of each color by each of the inkjet heads 202y to 202k by performing a predetermined process based on the CMYK value. In this case, for example, it is considered to be possible that a plate division process, a halftone process (quantization process), or the like based on the CMYK value are performed, the ejection position of an ink is determined, so that the ejection amount of ejecting an ink of each color is set. More specifically, the CMYK value can be considered, for example, as a value indicating the ejection amount of an ink of each color of cyan, magenta, yellow, and black. In this case, the CMYK value can also be considered, for example, as a parameter combining a C value corresponding to cyan color ink, an M value corresponding to magenta color ink, a Y value corresponding to yellow color ink, and a K value corresponding to black color. By using and variously changing the CMYK value, various colors can be expressed by the inkjet heads 202y to 202k.

In the step S104 of this example, the host PC 14 sets the initial value of the CMYK value according to the target color acquired in the step S102. In this case, for example, by using a profile for setting the initial value (for example, an ICC profile) prepared in advance and converting the target color indicated by the Lab value into the color indicated by the CMYK value, the host PC 14 sets the initial value of the CMYK value. In this case, for example, it can be considered that a conversion from the Lab value to the CMYK value is performed using software for color matching or the like used as a standard in a computer OS. In this case, for example, it can be considered to perform the conversion with setting that maintains an absolute color gamut.

Note that it can also be thought that when the Lab value indicating the target color is converted into the CMYK value using a profile such as an ICC profile, the CMYK value after being converted may be used as it is as the CMYK value of the target color. However, in this case, as a profile, it is necessary to create a profile that reflects variations in characteristics of the printing device 12 (machine differences or the like). However, in this case, it is necessary to create a profile that reflects variations in characteristics of the printing apparatus 12 (such as machine differences). However, creating such a profile with high accuracy usually takes a lot of time and effort. As described above, in this example, the color matching process is performed on not the predetermined basic color or the like but the color of which the colorimeter 204 in the printing device 12 performs colorimetry. In this case, if the CMYK value of the target color is desired to obtain only by conversion of the profile, it is necessary to use a profile capable of converting the color with high accuracy for all colors. However, it is usually difficult to prepare such a profile. On the other hand, in this example, by further performing the process described below, the color matching process for various colors can be achieved with high accuracy.

In this example, in succession to the operation of the step S104, the host PC 14 performs a process for determining the target color corresponding value that is the CMYK value corresponding to the target color (S106). In this case, the operation of the step S106 is one example of the operation of the target color corresponding value determination process. In the step S106 of this example, the host PC 14, for example, causes the inkjet heads 202y to 202k to print the patches that respectively correspond to the CMYK values different from each other. Then, the target color corresponding value is determined by selecting the patch having the color close to the target color from among the printed patches. More specifically, in the step S106 of this example, as illustrated in the drawing, the host PC 14 sequentially performs a first color selection process (S202), a second color selection process (S204), and a third color selection process (S206) in this order.

In this case, the first color selection process means, for example, a process for selecting the patch having the color close to the target color from among the patches having the CMYK values different each other at the preset first interval. The CMYK values are different from each other which means that, for example, any value of a C value, a M value, a Y value, and a K value constituting the CMYK value is different. The CMYK values are different from each other at the first interval which means that, as to any value of the C value, the M value, the Y value, and the K value, a difference between adjacent patches becomes a value corresponding to a predetermined first interval. The adjacent patches mean, for example, that being adjacent as a setting of the color among the patches in which CMYK are variously made different. Being adjacent as a setting of the color means, for example, that any one of the C value, the M value, the Y value, and the K value is different by a preset reference difference.

In this example, an interval of 4% is used as the first interval used in the first color selection process. In this case, the interval of 4% means an interval of 4% when the maximum value and the minimum value of the values that can be taken are respectively set to 100% and 0% for each of the C value, the M value, the Y value, and the K value. Accordingly, in this example, the same value is used as the first interval for each of the C value, the M value, the Y value, and the K value. In the modified example of the operation of the host PC 14, the first intervals of the C value, the M value, the Y value, and the K value may be set for each color. In this case, the value different from the others is set as the first interval for at least a part of the C value, the M value, the Y value, and the K value.

In this example, the first color selection process is performed, so that the CMYK value corresponding to the target color is narrowed down. In this case, narrowing down the CMYK value corresponding to the target color means, for example, limiting a range including the CMYK value corresponding to the target color to a part of an area in the CMYK color space. The specific operation of the first color selection process will be described later in more detail.

In this case, by using the result of the first color selection process and performing the second color selection process, the CMYK value corresponding to the target color is further narrowed down. In this case, the second color selection process means, for example, a process for selecting the patch having the color close to the target color from among the patches having the CMYK values different each other at the second interval that is narrower than the first interval. The CMYK values are different from each other at the second interval which means that any value of the C value, the M value, the Y value, and the K value becomes a value in which a difference between adjacent patches corresponds to a predetermined second interval.

In this example, the second interval used in the second color selection process is set to 2% that is half of the first interval used in the first color selection process. Accordingly, the same value is used as the second interval for each of the C value, the M value, the Y value, and the K value.

In the modified example of the operation of the host PC 14, the second intervals of the C value, the M value, the Y value, and the K value may be set for each color. In this case, the value different from the others is set as the second interval for at least a part of the C value, the M value, the Y value, and the K value. The specific operation of the second color selection process will be described later in more detail.

In this case, by using the result of the second color selection process and performing the third color selection process, the CMYK value corresponding to the target color is further narrowed down. In this example, by narrowing down the CMYK value, which is performed in the third color selection process, the target color corresponding value is determined and then output as the result of the target color corresponding value determination process. Determining the target color corresponding value means, for example, determining the CMYK value using as the value closest to the target color in the printing device 12.

In this case, the third color selection process means, for example, a process for selecting the patch having the color close to the target color from among the patches having the CMYK values different each other at the third interval that is narrower than the second interval. The CMYK values are different from each other at the third interval which means that any value of the C value, the M value, the Y value, and the K value becomes a value in which a difference between adjacent patches corresponds to a predetermined third interval.

In this example, the third interval used in the third color selection process is set to 1% that is half of the second interval used in the second color selection process. Accordingly, the same value is used as the third interval for each of the C value, the M value, the Y value, and the K value. In the modified example of the operation of the host PC 14, the third intervals of the C value, the M value, the Y value, and the K value may be set for each color. In this case, the value different from the others is set as the third interval for at least a part of the C value, the M value, the Y value, and the K value. The specific operation of the third color selection process will be described later in more detail.

Figure 3:
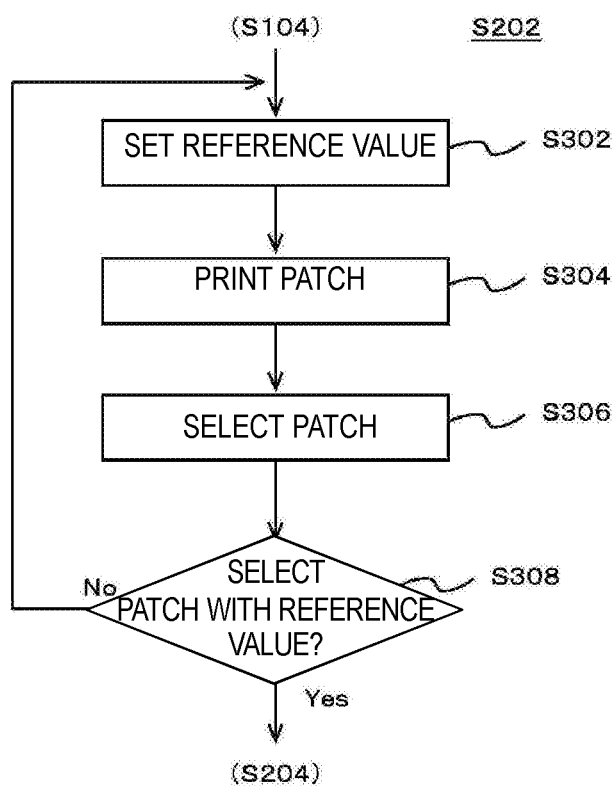
FIG. 3 is a flowchart illustrating one example of a specific operation in a first color selection process.
Figure 4A:
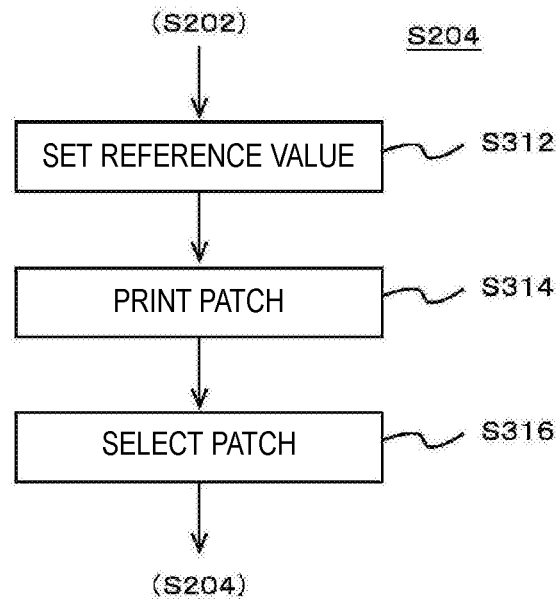
FIGS. 4A and 4B are flowcharts illustrating one example of specific operations in a second color selection process and a third color selection process.
Figure 4B:
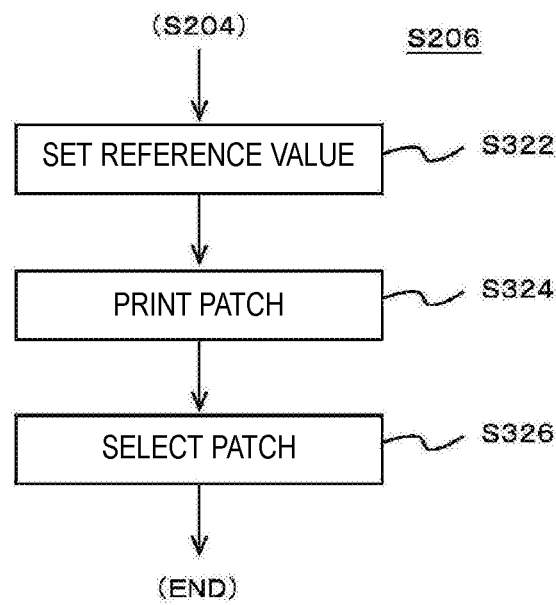

Next, the specific operations of the first color selection process, the second color selection process, and the third color selection process will be described in more detail. FIG. 3 and FIGS. 4A and 4B are the drawings describing the specific operations of the first color selection process, the second color selection process, and the third color selection process. FIG. 3 is a flowchart illustrating one example of the specific operation in the first color selection process. FIG. 4A is a flowchart illustrating one example of the specific operation in the second color selection process. FIG. 4B is a flowchart illustrating one example of the specific operation in the third color selection process.

In the first color selection process of this example, the host PC 14 firstly sets a first reference value used as a reference CMYK value in the first color selection process (S302). In this case, the operation in the step S302 is one example of the operation of the first reference value setting process. The reference CMYK value means, for example, a CMYK value used as a center value when printing the patches having the CMYK values that are variously made different. The reference CMYK value can also be considered, for example, as a CMYK value used as a center value of a range in which the colors are made different among the patches.

As can be understood from the flowchart illustrated in the drawing, in the first color selection process of this example, the operation of the step S302 is performed in the repetitive process performed as necessary. In this case, in the step S302 (the first time of the step S302) firstly performed after initiating the first color selection process, the initial value of the CMYK value set in the step S104 described with reference to FIG. 2 is set to the first reference value.

In succession to the operation of the step S302, the host PC 14 causes the inkjet heads 202y to 202k to print the patches based on the first reference value (S304). In this case, the operation of the step S304 is one example of the operation of the first patch printing process. Making the inkjet heads 202y to 202k print the patches means, for example, causing the inkjet heads 202y to 202k to print the chart including the patches.

More specifically, in the step S304 of this example, the host PC 14 causes the inkjet heads 202y to 202k to print the chart including the patches having the CMYK values different from each other from the first reference value at the first interval. More specifically, in this case, when the value corresponding to the first interval is expressed as Value, the C value, the M value, the Y value, and the K value constituting CMYK are made different in three ways; a value as it is in the first reference value, a value obtained by adding Value, and a value obtained by subtracting Value. As described above, in the first color selection process of this example, the value of Value is set to 4%.

In this case, if the C value, the M value, the Y value, and the K value corresponding to the first reference value are respectively set to c1, m1, y1, and k1, the values in the three ways; c1−Value, c1, and c1+Value will be used as the C value. Also, the values in the three ways; m1−Value, m1, and m1+Value will be used as the M value. The values in the three ways; y1−Value, y1, and y1+Value will be used as the Y value. The values in the three ways; k1−Value, k1, and k1+Value will be used as the K value. Therefore, in this case, by constituting the patches with all combinations of each value, the chart including 81 patches, which is a value of the fourth power of 3, is printed. In this case, as each patch, an area in which a certain range (for example, a predetermined rectangular range) is filled with the color having the corresponding CMYK value is formed.

In succession to the operation of the step S304, the host PC 14 selects the patch having the color closest to the target color from among the patches printed in the step S304 (S306). In this case, the operation of the step S306 is one example of the operation of the first patch selection process. More specifically, in the step S306 of this example, the host PC 14 causes the colorimeter 204 in the printing device 12 to perform colorimetry of the colors of the patches printed in the step S304. In this case, the host PC 14 also acquires, for example, the Lab value as the measurement result for the color of each patch. Then, the patch having the color closest to the target color from among the patches is selected based on the colorimetric measurement result for the patches and the target color acquired in the step S102 described with reference to FIG. 2.

Here, the patch selected in the step S306, for example, can be considered as a patch having the color closest to the target color among the patches printed in the step S304. However, the patches printed in the step S304 of this example indicate only some of the colors that can be expressed by the printing device 12. In this case, it can also be considered that there is a range closer to the target color outside the range of the colors corresponding to the patches printed in the step S304. Then, in the first color selection process of this example, the operations in the steps S302 to S306 are repeated a plurality of times as necessary as illustrated in the drawing. In this case, these processes are repeated until a predetermined condition is satisfied while changing the first reference value.

In order to perform such a repetitive process, in this example, in succession to the operation of the step S306, the host PC 14 determines whether the patch selected in the step S306 is a patch corresponding to the first reference value set in the step S302 (S308). In this case, the patch corresponding to the first reference value means a patch printed with a color having the CMYK value equal to the first reference value. The patch corresponding to the first reference value can also be considered, for example, as a patch having the center color among the patches.

More specifically, for example, when the patch selected as the patch having the color closest to the target color in the step S306 is defined as the first selection patch, in the step S308, the host PC 14 determines whether the CMYK value corresponding to the first selection patch is equal to the first reference value used in the step S306 in which the first selection patch is printed. Then, if the CMYK value corresponding to the first selection patch is different from the first reference value (S308: No), the process returns to the step S302 to set a new first reference value. In this case, in this example, the CMYK value corresponding to the first selection patch is set to a new first reference value. Then, the operations after the step S304 are performed again using the new first reference value. By this configuration, for example, the operations of the steps S302 to S306 can be repeated while changing the first reference value based on the selection result of the first selection patch in the step S306.

In the step S308, if the host PC 14 determines that the CMYK value corresponding to the first selection patch is equal to the first reference value (S308: Yes), the host PC 14 selects the first selection patch at this time as the patch having the color closest to the target color in the first color selection process. Then, the operation of the first color selection process is completed to proceed to the second color selection process.

By this configuration, for example, the operations in the steps S302 to S306 can be repeated until the CMYK value corresponding to the first selection patch coincides with the first reference value. In this case, by performing such a repetitive operation while changing the first reference value, the patch having the color close to the target color can be selected without limiting the range in which the CMYK value corresponding to the patch is searched.

When the first selection patch is selected from among the patches as described above, if the CMYK value corresponding to the first selection patch is equal to the first reference value, the center color in the range in which the CMYK value is changed can be considered to be selected as the color close to the target color. In this case, it can be considered that there is no color closer to the target color outside the range of the color corresponding to the patches printed in the step S304 that is usually performed last. Therefore, according to this example, in the first color selection process, for example, the patch having the color close to the target color can appropriately be selected with high accuracy while appropriately narrowing down the CMYK value corresponding to the target color.

In the second color selection process performed following the first color selection process, the host PC 14 firstly sets, for example, the second reference value used as the reference CMYK value in the second color selection process as illustrated in FIG. 4B (S312). In this case, the operation in the step S312 is one example of the operation of the second reference value setting process. In the step S312 of this example, the host PC 14 also sets the CMYK value corresponding to the patch selected as the patch having the color closest to the target color in the first color selection process as the second reference value. In this case, the patch selected as the patch having the color closest to the target color in the first color selection process means a first selection patch selected last in the repetitive process performed in the first color selection process.

In succession to the operation of the step S312, the host PC 14 causes the inkjet heads 202y to 202k to print the patches based on the second reference value (S314). In this case, the operation of the step S314 is one example of the operation of the second patch printing process. More specifically, in the step S314 of this example, the host PC 14 causes the inkjet heads 202y to 202k to print the chart including the patches having the CMYK values different from each other from the second reference value at the second interval by using the second interval that is narrower than the first interval used in the first color selection process. More specifically, when the value corresponding to the second interval is expressed as Value, among the C value, the M value, the Y value, and the K value constituting CMYK, the C value, the M value, and the Y value are made different in five ways; a value as it is in the second reference value, a value obtained by adding Value, a value obtained by adding double of Value, a value obtained by subtracting Value, and a value obtained by subtracting double of Value. As described above, in the second color selection process of this example, the value of Value is set to 2%. By this configuration, it is possible to print more patches and appropriately and sufficiently secure the range in which the CMYK values are made different while reducing the interval between the CMYK values. In this case, it can be considered that even if the values of the K value are made different at small interval, an influence on the expressed color is relatively small. Therefore, as to the K value, only the value of the K value as it is in the second reference value is used. By this configuration, for example, even if the values of the C value, the M value, and the Y value are made different in five ways, it is possible to appropriately prevent the number of patches from excessively increasing.

In this case, if the C value, the M value, the Y value, and the K value corresponding to the second reference value are respectively set to c2, m2, y2, and k2, the values in the five ways; c2−2Value, c2−Value, c2, c2+Value, and c2+2Value will be used as the C value. The values in the five ways; m2−2Value, m2−Value, m2, m2+Value, and m2+2Value will be used as the M value. The values in the five ways; y2−2Value, y2−Value, y2, y2+Value, and y2+2Value will be used as the Y value. Only k2 will be used as the K value as described above. Therefore, in this case, by constituting the patches with all combinations of each value, the chart including 125 patches, which is a value of the cube of 5, is printed. Also, in this case, as each patch, an area in which a certain range (for example, a predetermined rectangular range) is filled with the color having the corresponding CMYK value is formed.

In succession to the operation of the step S314, the host PC 14 selects the patch having the color closest to the target color from among the patches printed in the step S314 (S316). In this case, the operation of the step S316 is one example of the operation of the second patch selection process. More specifically, in the step S316 of this example, the host PC 14 causes the colorimeter 204 in the printing device 12 to perform colorimetry of the colors of the patches printed in the step S314. In this case, the host PC 14 also acquires, for example, the Lab value as the measurement result for the color of each patch. Then, the patch having the color closest to the target color from among the patches is selected based on the colorimetric measurement result for the patches and the target color acquired in the step S102 described with reference to FIG. 2.

Here, as described above with reference to FIG. 3 and the like, in the first color selection process, by repeating the printing of the patch and colorimetric measurement, the patch having the color close to the target color is selected without limiting the range of the CMYK value. On the other hand, in the processes after the second color selection process, it can be considered that the CMYK value used for expressing the target color, for example, is within a predetermined range determined corresponding to the patch finally selected in the first color selection process. Therefore, as to the processes after the second color selection process, for example, it can be considered that the processes are performed at a higher speed by limiting the range of CMYK value for printing the patch.

More specifically, in this example, for example, as illustrated in the drawing, the operations in the steps S312 to S316 are not performed repeatedly but are performed only once to select the patch having the color closest to the target color. By this configuration, for example, the second color selection process can be performed more rapidly and appropriately.

After selecting the patch having the color close to the target color in the second color selection process in this way, the host PC 14 further performs the third color selection process, for example, as illustrated in FIG. 4B, based on the selection result. In the third color selection process, the host PC 14 firstly sets the third reference value used as the reference CMYK value in the third color selection process (S322). In this case, the operation in the step S322 is one example of the operation of the third reference value setting process. In the step S322 of this example, the host PC 14 also sets the CMYK value corresponding to the patch selected as the patch having the color closest to the target color in the second color selection process as the third reference value. In this case, the patch selected as the patch having the color closest to the target color in the second color selection process means a patch selected in the step S316 in the second color selection process.

In succession to the operation of the step S322, the host PC 14 causes the inkjet heads 202*y* to 202*k* to print the patches based on the third reference value (S324). In this case, the operation of the step S324 is one example of the operation of the third patch printing process. More specifically, in the step S324 of this example, the host PC 14 causes the inkjet heads 202*y* to 202*k* to print the chart including the patches having the CMYK values different from each other from the third reference value at the third interval by using the third interval that is narrower than the second interval used in the second color selection process.

More specifically, in this case, when the value corresponding to the third interval is expressed as Value, among the C value, the M value, the Y value, and the K value constituting CMYK, the C value, the M value, and the Y value are made different in five ways; a value as it is in the third reference value, a value obtained by adding Value, a value obtained by adding double of Value, a value obtained by subtracting Value, and a value obtained by subtracting double of Value. As described above, in the third color selection process of this example, the value of Value is set to 1%. By this configuration, it is possible to print more patches and appropriately and sufficiently secure the range in which the CMYK values are made different while sufficiently reducing the interval between the CMYK values. Also, in this case, it can be considered that even if the values of the K value are made different at small interval, an influence on the expressed color is relatively small. Therefore, as to the K value, only the value of the K value as it is in the third reference value is used. By this configuration, for example, even if the values of the C value, the M value, and the Y value are made different in five ways, it is possible to appropriately prevent the number of patches from excessively increasing.

In this case, if the C value, the M value, the Y value, and the K value corresponding to the third reference value are respectively set to c3, m3, y3, and k3, the values in the five ways; c3−2Value, c3−Value, c3, c3+Value, and c3+2Value will be used as the C value. The values in the five ways; m3−2Value, m3−Value, m3, m3+Value, and m3+2Value will be used as the M value. The values in the five ways; y3−2Value, y3−Value, y3, y3+Value, and y3+2Value will be used as the Y value. Only k3 will be used as the K value as described above. Therefore, in this case, by constituting patches with all combinations of each value, the chart including 125 patches, which is a value of the cube of 5, is printed. Also, in this case, as each patch, an area in which a certain range (for example, a predetermined rectangular range) is filled with the color having the corresponding CMYK value is formed.

In succession to the operation of the step S324, the host PC 14 selects the patch having the color closest to the target color from among the patches printed in the step S324 (S326). In this case, the operation of the step S326 is one example of the operation of the third patch selection process. More specifically, in the step S326 of this example, the host PC 14 causes the colorimeter 204 in the printing device 12 to perform colorimetry of the colors of the patches printed in the step S324. In this case, the host PC 14 acquires, for example, the Lab value as the measurement result for the color of each patch. Then, the patch having the color closest to the target color from among the patches is selected based on the colorimetric measurement result for the patches and the target color acquired in the step S102 described with reference to FIG. 2. In this example, the CMYK value corresponding to the patch selected in the step S326 in the third color selection process is treated as the target color corresponding value that is the CMYK value corresponding to the target color. According to this example, the process for determining the target color corresponding value can appropriately be performed.

As described above, in the processes after the second color selection process, the CMYK value used for expressing the target color, for example, can be considered to be within a predetermined range determined corresponding to the patch finally selected in the first color selection process. Therefore, it is preferable that the third color selection process be also performed by limiting the range of the CMYK value for printing the patch, in the same way as the second color selection process. More specifically, in this example, for example, as illustrated in the drawing, the operations in the steps S322 to S326 are not performed repeatedly, but are performed only once to select the patch having the color closest to the target color. By this configuration, for example, the third color selection process can be performed more rapidly and appropriately.

When being configured as described above, for example, by performing the first color selection process in which the interval between the CMYK values is widened, the CMYK values that can reproduce the color close to the target color can appropriately be narrowed down. By using the result in the first color selection process and performing the second color selection process in which the interval between the CMYK values is narrowed, the range of the CMYK value that can reproduce the color close to the target color can be narrowed down to a smaller range. The target color corresponding value can appropriately be determined by performing the third color selection process in which the interval between the CMYK values is further narrowed by using the result in the second color selection process. In this case, by printing using the determined target color corresponding value, for example, the target color can appropriately be reproduced with high accuracy.

Here, as described above, in this example, the operations for printing the patch and performing colorimetric measurement are repeated only in the first color selection process and these operations are performed only once in the second color selection process and the third color selection process. In this regard, for example, when considering to select the patch having the color close to the target color with higher accuracy in the second color selection process, in the second color selection process, the operations in the steps S312 to S316 may also be repeated in the same or similar manner as the repetitive operations in the first color selection process. More specifically, in this case, in the second color selection process, for example, it can be considered to further determine whether the CMYK value corresponding to the second selection patch that is the patch selected as the patch having the color closest to the target color in the step S316 coincides with the second reference value. Then, it can be considered that if the CMYK value corresponding to the second selection patch is different from the second reference value, for example, the process returns to the step S312 to set the CMYK value corresponding to the second selection patch to a new second reference value. In this case, by performing the succeeding operations again, for example, the operations in the steps S312 to S316 are repeated until the CMYK value corresponding to the second selection patch coincides with the second reference value while changing the second reference value based on the selection result of the second selection patch. Then, the second selection patch at a point of time when the CMYK value corresponding to the second selection patch coincides with the second reference value is selected as the patch having the color closet to the target color in the second color selection process. By this configuration, for example, the second color selection process can appropriately be performed with higher accuracy.

On the other hand, as the third color selection process in this example, in the color selection process performed last, the patches having the smallest interval between the CMYK values are printed to perform the colorimetric measurement by the colorimeter 204. In this case, it can also be considered that the interval between the CMYK values becomes small, and therefore the colorimetric measurement becomes easy to be affected by, for example, errors or the like that occur in the measurement result. As a result, for example, it can also be considered that when the repetitive process such as the first color selection process is performed, the result becomes difficult to converge and the time required for the process significantly increases. It can also be considered that the time required for the process becomes too long so that the process cannot appropriately be performed. Therefore, in the color selection process performed last, it is preferable to print and select the patch only once without performing the repetitive process described above. By this configuration, for example, the target color corresponding value can be determined more appropriately.

As described above, in the step S314 in the second color selection process and the step S324 in the third color selection process of this example, the C value, the M value, and the Y value are made different in five ways. Accordingly, for example, the number of stages in which the C value, the M value, and the Y value are made different is larger, as compared with those in a case of printing the patches in the first color selection process. As a result, the number of patches printed in the step S314 in the second color selection process and in the step S324 in the third color selection process is larger than the number of patches printed in the step S304 in the first color selection process or the number of patches printed in the step S314 in the second color selection process. By this configuration, for example, the target color corresponding value can be determined more appropriately without performing the repetitive process described above.

Figure 5:
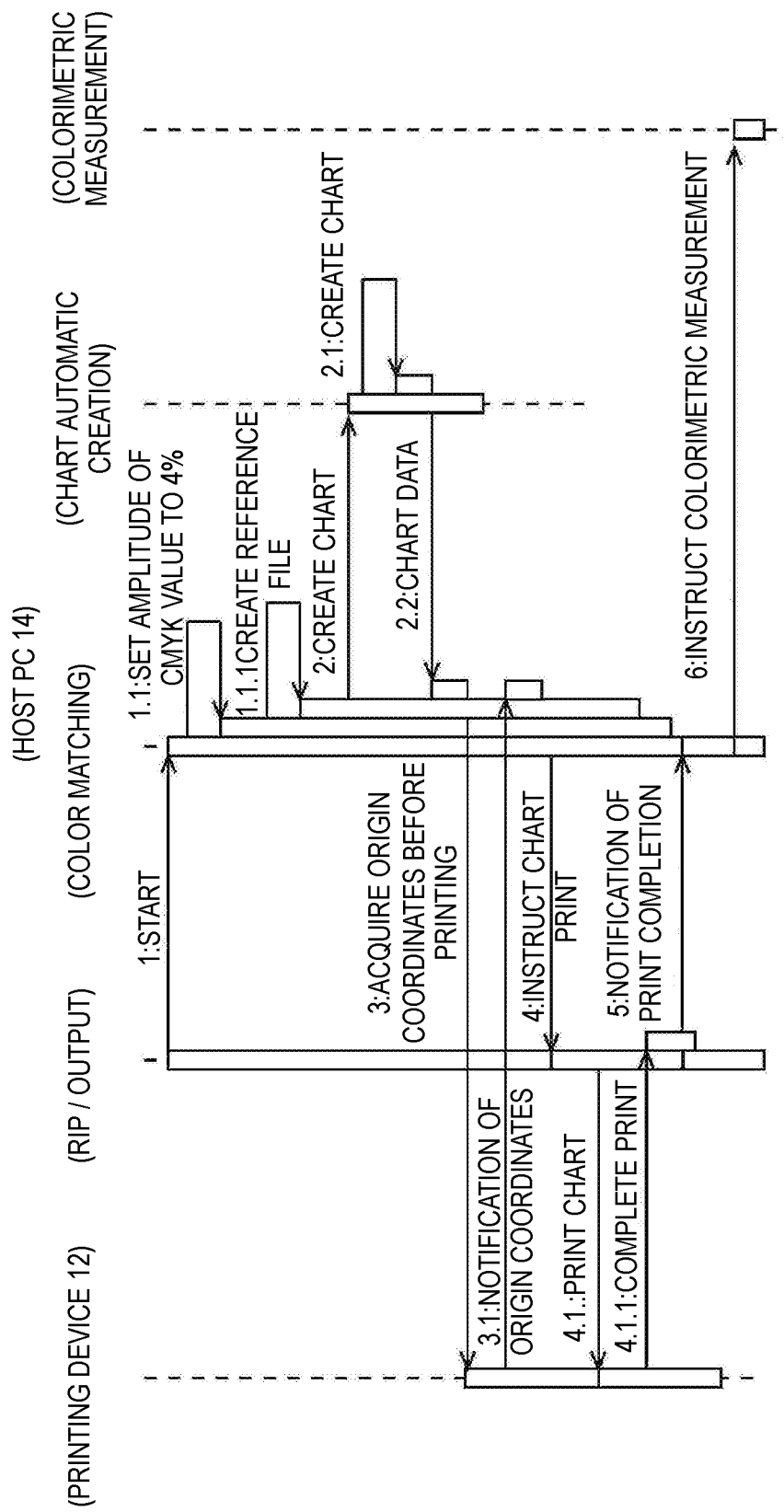
FIG. 5 is a sequence diagram illustrating one example of an operation for performing a color matching process in a printing device 12 and a host PC 14 in a printing system 10.
Figure 6:
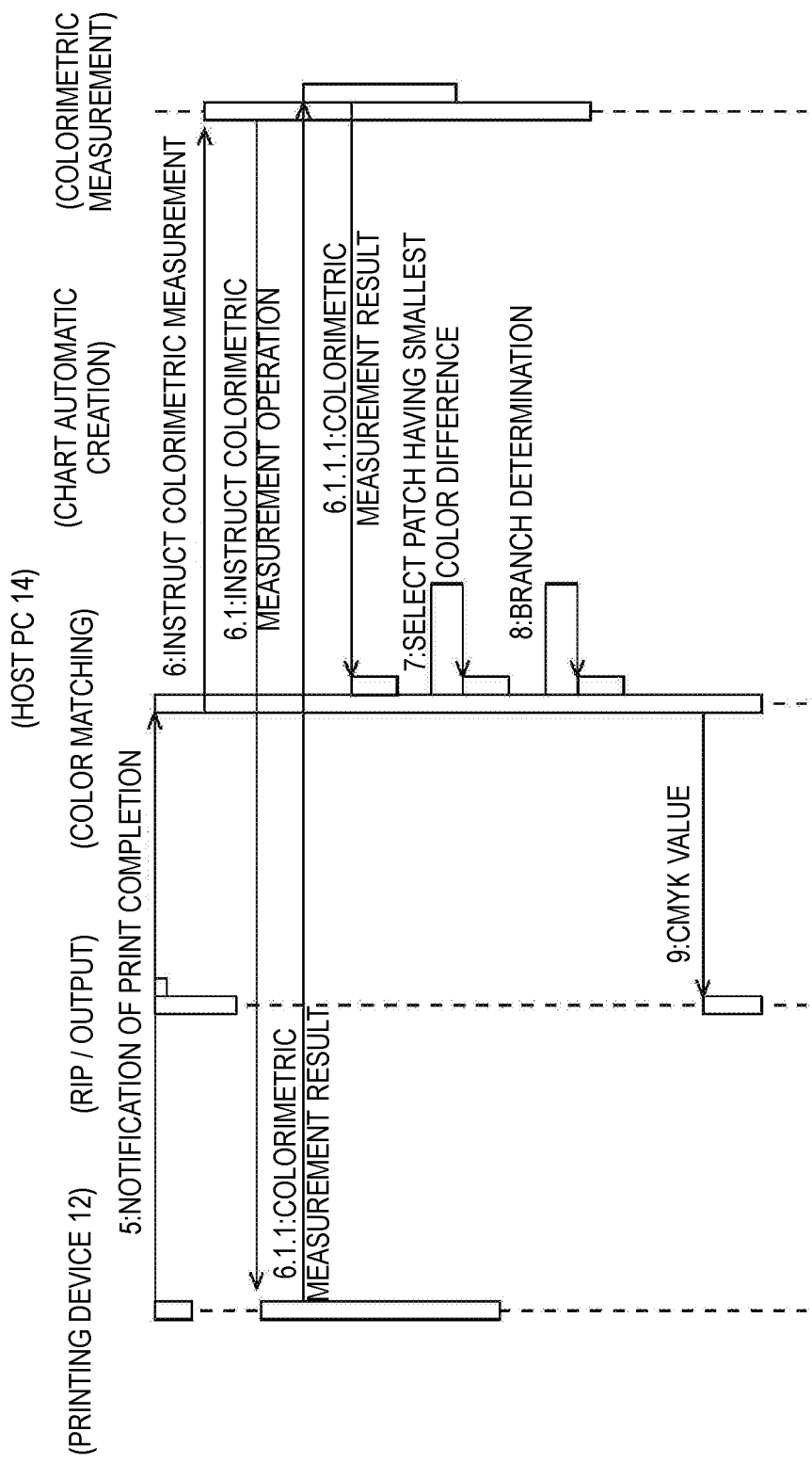
FIG. 6 is a sequence diagram illustrating one example of an operation for performing a color matching process in the printing device 12 and a host PC 14 in the printing system 10

Next, the color matching process performed in this example will be described from another viewpoint using a sequence diagram. FIG. 5 and FIG. 6 are sequence diagrams illustrating one example of an operation for performing the color matching process in the printing device 12 and the host PC 14 in the printing system 10.

Note that, as can be understood from the drawings, FIG. 5 and FIG. 6 illustrate the operations performed in the printing device 12 and the host PC 14 at the time of the color matching by dividing into two diagrams. In order to illustrate the position where two drawings are connected, some operations are illustrated in both FIG. 5 and FIG. 6. In FIG. 5 and FIG. 6, the operations executed by the host PC 14 in accordance with the program are illustrated by functions by dividing into a plurality of functions as illustrated as RIP/output, color matching, chart automatic creation, and colorimetric measurement in the drawing. These functions are realized, for example, by individual software, a program module corresponding to each function, or the like. In this example, assemblies gathering this software, modules or the like can be considered as one example of a program executed in the host PC 14.

The operations of the sequences illustrated in FIG. 5 and FIG. 6 indicates the operations of the printing device 12 and the host PC 14 after the colorimetric measurement of the color to be a target performed using the colorimeter 204 in the printing device 12 is completed. More specifically, in this case, it is considered that the Lab value indicating the target color in the color matching process and the initial value of the CMYK value set based on the Lab value have already been set.

In this case, the host PC 14 initiates the color matching process by firstly starting a module for color matching from software (RIP/output software) for controlling an RIP process and a print output. In this case, it can be considered to perform the starting process using a function, in which, for example, the starting mode, the Lab value indicating the target color (target Lab value), the initial value of the CMYK value, the colorimeter in use, the image format, the medium width (media), or the like are used as an argument. In this case, as the colorimeter in use, for example, a parameter indicating a device used as the colorimeter 204 is set. As the image format, for example, a parameter indicating the format of the image used in the color matching process is used depending on the format of the image such as pdf, or tiff. As the medium width, a parameter indicating the width of the medium used for printing the chart including the patches is used. The parameter used as an argument may be changed as appropriate in accordance with specific program specifications or the like. For example, the initial value of the CMYK value may not be received as an argument but may be set after starting the color matching process. In this case, it can be considered that, for example, a parameter indicating an ICC profile used when setting the initial value of CMYK may be used as an argument.

In the color matching module starting in this way, an operation corresponding to the first color selection process described above with reference to FIG. 3 and the like is firstly initiated. More specifically, in this case, an amplitude of the CMYK value (Value), which is an interval in which the CMYK values are made different from each other in the patches included in the chart is set to 4% corresponding to the interval (first interval) used in the first color selection process. Then, a reference file that is a file including information necessary upon creating the chart, is created based on the amplitude and the initial value of CMYK. As described above, in the operation corresponding to the first color selection process, the chart including 81 patches is used. Therefore, in the operation corresponding to the first color selection process, the file corresponding to the chart including 81 patches is created as the reference file. In this case, the initial value of CMYK is set to the reference value (first reference value) to set the CMYK value corresponding to each of the patches. In this example, in the reference file, for example, the number of patches arranged in a vertical direction and in a horizontal direction of the medium is changed according to the width of the medium, so that the layout of the patches is further specified.

Note that the number of patches may be reduced more than the normal number thereof depending on the reference CMYK value used as the center value when printing the patches. More specifically, it can be considered that if any value of the C value, the M value, the Y value, and the K value in the CMYK value is 0% or 100%, it is not necessary to print the corresponding patch for the value that is increased or decreased. Therefore, in such a case, it is preferable to omit such patches and reduce the number of patches.

After completing to create the reference file, for example, the chart is created by starting a chart automatic creation tool that is software for automatically creating the chart from the color matching module. In this case, it can be considered to start the chart automatic creation tool from the color matching module using, for example, the reference file, the colorimeter in use, and the image format as an argument.

In this case, the chart automatic creation tool, for example, creates chart data that is image data indicating the chart including the patches according to the reference file. In this case, based on the parameter indicating the colorimeter in use and the image format, image data having a specified image format is created according to the colorimeter 204 used for the colorimetric measurement for the patches. Then, the created chart data is supplied to the color matching module.

In this case, the color matching module causes the printing device 12 to print an image indicated by the chart data, for example, through the RIP/output software. In this operation, the color matching module inquires about the origin coordinates of the printing (acquire the origin before printing) before causing the printing device 12 to initiate the printing operation. Then, an output instruction for printing the chart is given to the RIP/output software using the origin coordinates that receive a notification from the printing device 12. In this case, as the output instruction, for example, it can be considered to create and issue a print instruction sheet that specifies the printing operation. The color matching module waits until the printing of the chart in the printing device 12 is completed after giving the output instruction.

The RIP/output software that has received the output instruction causes the printing device 12 to execute the printing of the chart. In this case, at the time point when the printing of the chart has been completed, the printing device 12 notifies the RIP/output software that the printing of the chart has been completed. Then, the RIP/output software notifies the color matching module that the printing of the chart has been completed.

Then, after receiving the notification that the printing of the chart has been completed, the color matching module starts a colorimetric measurement tool which is software for controlling the operation of the colorimetric measurement performed using the colorimeter 204 in the printing device 12 and initiates the colorimetric measurement for the patch. In this case, for example, it can be considered to start the colorimetric measurement tool in an operation mode (automatic colorimetric measurement mode) in which the colorimetric measurement for the patches included in the chart is automatically performed. In this case, the color matching module causes the colorimetric measurement tool to execute the necessary position adjustment (for example, automatic chart retraction or the like), for example, by notifying the colorimetric measurement tool of the origin coordinates of the printing that are previously acquired. Then, the colorimetric measurement tool causes the colorimeter 204 in the printing device 12 to measure the color of each of the patches. Accordingly, the colorimetric measurement tool also receives the colorimetric measurement result (colorimetric measurement data) from the printing device 12. The colorimetric measurement tool also notifies the color matching module of the received colorimetric measurement result.

In this case, in the color matching module, the patch having the smallest color difference from the Lab value indicating the target color is selected based on the Lab value indicating the target color prepared in advance and the colorimetric measurement result. Accordingly, the CMYK value set for this patch is treated as the CMYK value having the color closest to the target color at this point.

Note that, in this example, as the colorimetric measurement result, for example, data including the Lab value indicating the colorimetric measurement result for each patch is used. In the process for selecting a patch having the smallest color difference from the Lab value indicating the target color, the difference between the Lab value indicating the target color and the Lab value corresponding to each patch is calculated, so that the patch having the smallest color difference from the Lab value indicating the target color is selected.

In this example, in the color matching module, after selecting the patch, branch determination for determining a process to be subsequently performed is performed. More specifically, in the first color selection process of this example, as described above with reference to FIG. 3 and the like, the operation for printing the chart including the patches and the operation for performing colorimetry of the colors of the patches are repeated a plurality of times as necessary. In this case, the operations of the steps S302 to S306 illustrated in FIG. 3 are repeated until the CMYK value corresponding to the selected patch coincides with the reference value (first reference value).

Therefore, in the case where the amplitude of the CMYK value is set to 4% and the first color selection process is performed in the operations of the sequences illustrated in FIG. 5 and FIG. 6, if the CMYK value corresponding to the selected patch is different from the first reference value, the CMYK value corresponding to the selected patch is set to a new first reference value, the process returns to the position indicated as 1.1.1: CREATE REFERENCE FILE in the drawing, and the new reference file is created. By performing the subsequent operations based on the reference file that is newly created, a new chart is printed and the patch is selected again.

Note that, in the case of performing the repetitive operation in this way, the patches having the same CMYK value as that of the patch in which the colorimetric measurement has already been performed may be omitted to create the reference file. By this configuration, for example, the number of patches to be printed can appropriately be reduced.

In this branch determination, if it is determined that the CMYK value corresponding to the selected patch coincides with the first reference value, the amplitude of the CMYK value is set to 2% that is the interval between the CMYK values (second interval) in the second color selection process, the CMYK value corresponding to the selected patch is set to the reference value (second reference value) in the second color selection process, and the process returns to the position indicated as 1.1.1: CREATE REFERENCE FILE in the drawing. Then, a new reference file is created using the amplitude of the CMYK value that is newly set and the second reference value and the subsequent operations are further performed, so that the operation of the second color selection process is performed. In this case, as described above, in the second color selection process of this example, the chart including 125 patches is printed. Therefore, the file corresponding to the chart including 125 patches is created as the reference file.

As described above, in the second color selection process and the third color selection process of this example, a repetitive operation like the first color selection process is not performed. Therefore, at the position of branch determination in the second color selection process, simply, the amplitude of the CMYK value is set to 1% that is the interval between the CMYK values (third interval) in the third color selection process, the CMYK value corresponding to the selected patch is set to the reference value (third reference value) in the third color selection process, and the process returns to the position indicated as 1.1.1: CREATE REFERENCE FILE in the drawing. Then, a new reference file is created using the amplitude of the CMYK value that is newly set and the third reference value and the subsequent operations are further performed, so that the operation of the third color selection process is performed. Also, in this case, the file corresponding to the chart including 125 patches is created as the reference file.

In this example, the third color selection process is a process for finally determining the target color corresponding value that is the CMYK value corresponding to the target color. Therefore, the CMYK value corresponding to the selected patch is set to the target color corresponding value at the position of branch determination in the third color selection process. Then, the color matching module notifies the RIP/output software of the target color corresponding value as a return value.

According to this example, for example, the CMYK value that can reproduce the color close to the target color can appropriately be determined. Accordingly, for example, the target color can appropriately be reproduced with high accuracy in the printing device 12.

Next, supplementary explanations and the like regarding each configuration described above will be given. As described above, according to this example, for example, the CMYK value that can reproduce the color close to the target color can appropriately be determined. In this case, the operation for determining the CMYK value corresponding to the target color can also be considered, for example, as a process for replacing the target color with the color that can be expressed by the ink used in the printing device 12. As described above, in this example, by performing the color selection process (the first color selection process, the second color selection process, and the third color selection process) a plurality of times while gradually narrowing the interval between CMYK values, the CMYK value corresponding to the target color can be determined with high accuracy. In this case, it is preferable that the color difference ($\Delta E$) be less than about 1.6 between the color of the patch selected in the third color selection process which is the last color selection process and the target color. By this configuration, the CMYK value corresponding to the target color can appropriately be determined with high accuracy.

As can be understood from the above description or the like, in this example, it also becomes possible to automatically perform the operations, for example, from the acquisition of the target color up to the determination of the CMYK value corresponding to the target color by automatically measuring the color of the target or the patch using the colorimeter 204 in the printing device 12 without requiring operation, judgment, or the like by the user. More specifically, in this case, for example, it also becomes possible to perform the color matching process in a state that the user is away at night or the like.

As described above, in this example, the first color selection process, the second color selection process, and the third color selection process are performed as the process for determining the target color corresponding value. In this case, the CMYK value corresponding to the target color is determined in the third color selection process that is the color selection process to be performed last. By this configuration, for example, the CMYK value corresponding to the target color can appropriately be determined based on the colorimetric measurement result for the patches in which the interval between CMYK values is made narrowest.

It can also be considered that, in a modified example of the operation of the color matching process, the color selection process is performed at the number of stages except three stages. More specifically, in this case, it can also be considered that, in the process for determining the target color corresponding value, only the first color selection process and the second color selection process are performed without performing the third color selection process. In this case, it can be considered to determine the CMYK value corresponding to the target color in the second color selection process. It can also be considered that, in the process for determining the target color corresponding value, the color selection process for printing the patches in which the interval between the CMYK values is narrower than that of the third color selection process is further performed. In this case, it can be considered that, in the color selection process for printing the patches in which the interval between CMYK values is made narrowest, the CMYK value corresponding to the target color is determined.

In this example, it can be considered that it is necessary for the target color to be at least a color within the color gamut (within gamut) of the color that can be expressed by the ink used in the printing device 12. Therefore, if the target color is not within the color gamut, for example, an error display or the like may be performed at a predetermined timing and the color matching process may be terminated.

In the above description, as to the configuration of the printing system 10, the case where the printing device 12 and the host PC 14 are mainly configured as separate devices has been described. However, in a modified example of the configuration of the printing system 10, the printing system 10 may be configured by a single apparatus. In this case, for example, it can be considered that a part of the printing device 12 (for example, the controller 120 in the printing device 12) also has a function as the host PC 14. In this case, in a single apparatus configuring the printing system 10, a part including the inkjet heads and the colorimeter may be considered as a printing device, and a part including the controller may be considered as a control device.

INDUSTRIAL APPLICABILITY

The present invention can suitably be used, for example, for a printing system.

What is claimed is:

1. A printing system that performs a printing by an inkjet method, comprising:
   a printing device, configured to perform the printing by the inkjet method; and
   a control device, configured to control an operation of the printing device,
   wherein the printing device includes:
      a plurality of inkjet heads, configured to eject inks of colors different form each other by the inkjet method, and
      a colorimeter, configured to perform colorimetry of a color printed by the inkjet heads,
   wherein the control device is capable of performing a color matching process for matching a color printed by the inkjet heads in the printing device with a target color,
   the control device is configured to perform, in the color matching process,
      a target color acquiring process for acquiring the target color by causing the colorimeter in the printing device to perform colorimetry of the color of an object in which the target color is expressed,
      an initial value setting process for setting an initial value of a color setting value that is a value indicating an ejection amount of ejecting an ink of each color by each of the inkjet heads, and
      a target color corresponding value determination process that is a process for determining a target color corresponding value that is the color setting value corresponding to the target color, through which the inkjet heads are caused to print a plurality of patches that are respectively associated with the color setting values different from each other and a patch having a color close to the target color is selected from among the patches to determine the target color corresponding value,
   the control device is configured to perform, in the target color corresponding value determination process,
      a first color selection process for selecting a patch having a color close to the target color from among the patches having the color setting values different from each other at a first interval that is preset, and
      a second color selection process for selecting a patch having a color close to the target color from among the patches having the color setting values different from each other at a second interval that is narrower than the first interval,
   the control device is configured to perform, in the first color selection process,
      a first reference value setting process for setting an initial value of the color setting value set in the initial value setting process as a first reference value which is the color setting value of a reference in the first color selection process,
      a first patch printing process for causing the inkjet heads to print the patches having the color setting values different from each other from the first reference value at the first interval, and
      a first patch selection process for selecting a patch having a color closest to the target color from among the patches based on a colorimetric measurement result for the patches obtained by causing the colorimeter to perform colorimetry of the colors of the patches printed by the first patch printing process and the target color acquired in the target color acquiring process, and
   the control device is configured to perform, in the second color selection process,
      a second reference value setting process for setting the color setting value corresponding to a patch selected as a patch having a color closest to the target color in the first color selection process as a second reference value that is the color setting value of a reference in the second color selection process,
      a second patch printing process for causing the inkjet heads to print the patches having the color setting values different from each other from the second reference value at the second interval, and
      a second patch selection process for selecting a patch having a color closest to the target color from among the patches based on a colorimetric measurement result for the patches obtained by causing the colorimeter to perform colorimetry of the colors of the patches printed by the second patch printing process and the target color acquired in the target color acquiring process.

2. The printing system according to claim 1, wherein,
   in the first color selection process,
   when the color setting value corresponding to a first selection patch that is a patch selected as a patch having a color closest to the target color in the first patch selection process and the first reference value used in the first patch printing process are different,
   the color setting value corresponding to the first selection patch is set to a new first reference value and the first patch printing process and the first patch selection process are performed again, and
   the first patch printing process and the first patch selection process are repeated until the color setting value corresponding to the first selection patch coincides with the first reference value used in the first patch printing process while changing the first reference value based on a selection result of the first selection patch in the first patch selection process, and
   the first selection patch at a point of time when the color setting value corresponding to the first selection patch coincides with the first reference value used in the first patch printing process is selected as a patch having a color closet to the target color in the first color selection process.

3. The printing system according to claim 2, wherein,
   in the second color selection process,
   a patch having a color closest to the target color in the second color selection process is selected by performing the second patch printing process once and the second patch selection process once.

4. The printing system according to claim 2, wherein,
in the second color selection process,
when the color setting value corresponding to a second selection patch that is a patch selected as a patch having a color closest to the target color in the second patch selection process and the second reference value used in the second patch printing process are different,
the color setting value corresponding to the second selection patch is set to a new second reference value and the second patch printing process and the second patch selection process are performed again, and
the second patch printing process and the second patch selection process are repeated until the color setting value corresponding to the second selection patch coincides with the second reference value used in the second patch printing process while changing the second reference value based on a selection result of the second selection patch in the second patch selection process, and
the second selection patch at a point of time when the color setting value corresponding to the second selection patch coincides with the second reference value used in the second patch printing process is selected as a patch having a color closet to the target color in the second color selection process.

5. The printing system according to claim 2, wherein,
the control device is configured to perform, in the target color corresponding value determination process,
a third color selection process for selecting a patch having a color close to the target color from among the patches having the color setting values different from each other at a third interval that is narrower than the second interval is further performed, and
the control device is configured to perform, in the third color selection process,
a third reference value setting process for setting the color setting value corresponding to a patch selected as a patch having a color closest to the target color in the second color selection process as a third reference value that is the color setting value of a reference in the third color selection process,
a third patch printing process for causing the inkjet heads to print the patches having the color setting values different from each other from the third reference value at the third interval, and
a third patch selection process for selecting a patch expressing a color closest to the target color from among the patches based on a colorimetric measurement result for the patches obtained by causing the colorimeter to perform colorimetry of the colors of the patches printed by the third patch printing process and the target color acquired in the target color acquiring process.

6. The printing system according to claim 5, wherein,
in the third color selection process,
a patch having a color closest to the target color in the third color selection process is selected by performing the third patch printing process once and the third patch selection process once.

7. The printing system according to claim 1, wherein
each of the inkjet heads ejects an ink of each color of cyan, magenta, yellow, and black and
the color setting value is a value indicating an ejection amount of an ink of each color of cyan, magenta, yellow, and black.

8. The printing system according to claim 3, wherein,
the control device is configured to perform, in the target color corresponding value determination process,
a third color selection process for selecting a patch having a color close to the target color from among the patches having the color setting values different from each other at a third interval that is narrower than the second interval is further performed, and
the control device is configured to perform, in the third color selection process,
a third reference value setting process for setting the color setting value corresponding to a patch selected as a patch having a color closest to the target color in the second color selection process as a third reference value that is the color setting value of a reference in the third color selection process,
a third patch printing process for causing the inkjet heads to print the patches having the color setting values different from each other from the third reference value at the third interval, and
a third patch selection process for selecting a patch expressing a color closest to the target color from among the patches based on a colorimetric measurement result for the patches obtained by causing the colorimeter to perform colorimetry of the colors of the patches printed by the third patch printing process and the target color acquired in the target color acquiring process.

9. The printing system according to claim 4, wherein,
the control device is configured to perform, in the target color corresponding value determination process,
a third color selection process for selecting a patch having a color close to the target color from among the patches having the color setting values different from each other at a third interval that is narrower than the second interval is further performed, and
the control device is configured to perform, in the third color selection process,
a third reference value setting process for setting the color setting value corresponding to a patch selected as a patch having a color closest to the target color in the second color selection process as a third reference value that is the color setting value of a reference in the third color selection process,
a third patch printing process for causing the inkjet heads to print the patches having the color setting values different from each other from the third reference value at the third interval, and
a third patch selection process for selecting a patch expressing a color closest to the target color from among the patches based on a colorimetric measurement result for the patches obtained by causing the colorimeter to perform colorimetry of the colors of the patches printed by the third patch printing process and the target color acquired in the target color acquiring process.

10. The printing system according to claim 2, wherein
each of the inkjet heads ejects an ink of each color of cyan, magenta, yellow, and black and
the color setting value is a value indicating an ejection amount of an ink of each color of cyan, magenta, yellow, and black.

11. The printing system according to claim 3, wherein
each of the inkjet heads ejects an ink of each color of cyan, magenta, yellow, and black and the color setting value is a value indicating an ejection amount of an ink of each color of cyan, magenta, yellow, and black.

12. The printing system according to claim 4, wherein each of the inkjet heads ejects an ink of each color of cyan, magenta, yellow, and black and
the color setting value is a value indicating an ejection amount of an ink of each color of cyan, magenta, yellow, and black.

13. The printing system according to claim 5, wherein each of the inkjet heads ejects an ink of each color of cyan, magenta, yellow, and black and
the color setting value is a value indicating an ejection amount of an ink of each color of cyan, magenta, yellow, and black.

14. The printing system according to claim 6, wherein each of the inkjet heads ejects an ink of each color of cyan, magenta, yellow, and black and
the color setting value is a value indicating an ejection amount of an ink of each color of cyan, magenta, yellow, and black.

15. A color matching method for matching a color printed by a printing device, and the printing device including a plurality inkjet heads configured to eject inks of colors different from each other by an inkjet method; and a colorimeter configured to perform colorimetry of a color printed by the inkjet heads, and the color matching method comprising:

performing a color matching process for matching a color printed by the inkjet heads in the printing device with a target color, wherein,
in the color matching process,
a target color acquiring process for acquiring the target color by causing the colorimeter in the printing device to perform colorimetry of the color of an object in which the target color is expressed,
an initial value setting process for setting an initial value of a color setting value that is a value indicating an ejection amount of ejecting an ink of each color by each of the inkjet heads, and
a target color corresponding value determination process that is a process for determining a target color corresponding value that is the color setting value corresponding to the target color, through which the inkjet heads are caused to print a plurality of patches that are respectively associated with the color setting values different from each other and a patch having a color close to the target color is selected from among the patches to determine the target color corresponding value are performed;
in the target color corresponding value determination process,
a first color selection process for selecting a patch having a color close to the target color from among the patches having the color setting values different from each other at a first interval that is preset, and
a second color selection process for selecting a patch having a color close to the target color from among the patches having the color setting values different from each other at a second interval that is narrower than the first interval are performed;
in the first color selection process,
a first reference value setting process for setting an initial value of the color setting value set in the initial value setting process as a first reference value which is the color setting value of a reference in the first color selection process,
a first patch printing process for causing the inkjet heads to print the patches having the color setting values different from each other from the first reference value at the first interval, and
a first patch selection process for selecting a patch having a color closest to the target color from among the patches based on a colorimetric measurement result for the patches obtained by causing the colorimeter to perform colorimetry of the colors of the patches printed by the first patch printing process and the target color acquired in the target color acquiring process are performed; and
in the second color selection process,
a second reference value setting process for setting the color setting value corresponding to a patch selected as a patch having a color closest to the target color in the first color selection process as a second reference value that is the color setting value of a reference in the second color selection process,
a second patch printing process for causing the inkjet heads to print the patches having the color setting values different from each other from the second reference value at the second interval, and
a second patch selection process for selecting a patch having a color closest to the target color from among the patches based on a colorimetric measurement result for the patches obtained by causing the colorimeter to perform colorimetry of the colors of the patches printed by the second patch printing process and the target color acquired in the target color acquiring process are performed.

16. A non-transitory computer readable medium stored with a program for controlling an operation for matching a color printed by a printing device including a plurality inkjet heads configured to eject inks of colors different from each other by an inkjet method and a colorimeter configured to perform colorimetry of a color printed by the inkjet heads, which controls an operation for a color matching process for matching a color printed the inkjet heads in the printing device to a target color, wherein,
in the color matching process,
a target color acquiring process for acquiring the target color by causing the colorimeter in the printing device to perform colorimetry of the color of an object in which the target color is expressed,
an initial value setting process for setting an initial value of a color setting value that is a value indicating an ejection amount of ejecting an ink of each color by each of the inkjet heads, and
a target color corresponding value determination process that is a process for determining a target color corresponding value that is the color setting value corresponding to the target color, through which the inkjet heads are caused to print a plurality of patches that are respectively associated with the color setting values different from each other and a patch having a color close to the target color is selected from among the patches to determine the target color corresponding value are performed;
in the target color corresponding value determination process,
a first color selection process for selecting a patch having a color close to the target color from among the patches having the color setting values different from each other at a first interval that is preset, and
a second color selection process for selecting a patch having a color close to the target color from among the patches having the color setting values different from each other at a second interval that is narrower than the first interval are performed;
in the first color selection process,
a first reference value setting process for setting an initial value of the color setting value set in the initial value setting process as a first reference value which is the color setting value of a reference in the first color selection process,
a first patch printing process for causing the inkjet heads to print the patches having the color setting values different from each other from the first reference value at the first interval, and
a first patch selection process for selecting a patch having a color closest to the target color from among the patches based on a colorimetric measurement result for the patches obtained by causing the colorimeter to perform colorimetry of the colors of the patches printed by the first patch printing process and the target color acquired in the target color acquiring process are performed; and
in the second color selection process,
a second reference value setting process for setting the color setting value corresponding to a patch selected as a patch having a color closest to the target color in the first color selection process as a second reference value that is the color setting value of a reference in the second color selection process,
a second patch printing process for causing the inkjet heads to print the patches having the color setting values different from each other from the second reference value at the second interval, and
a second patch selection process for selecting a patch having a color closest to the target color from among the patches based on a colorimetric measurement result for the patches obtained by causing the colorimeter to perform colorimetry of the colors of the patches printed by the second patch printing process and the target color acquired in the target color acquiring process are performed.

* * * * *